United States Patent [19]
Erlston

[11] Patent Number: 5,224,725
[45] Date of Patent: Jul. 6, 1993

[54] TWO-WHEELED-DRIVE TWO WHEELED VEHICLE

[76] Inventor: Lester J. Erlston, P.O. Box 3376, Randburg 2125, South Africa

[21] Appl. No.: 696,822

[22] Filed: May 7, 1991

[30] Foreign Application Priority Data

| May 10, 1990 | [ZA] | South Africa | 90/3545 |
| Jun. 14, 1990 | [ZA] | South Africa | 90/4605 |
| Mar. 28, 1991 | [ZA] | South Africa | 91/2345 |

[51] Int. Cl.⁵ .................................................. B62M 1/02
[52] U.S. Cl. ................................... 280/259; 280/261; 74/665 GE
[58] Field of Search .............. 280/259, 260, 261, 267; 180/224, 212, 223; 74/665 GE, 417

[56] References Cited

U.S. PATENT DOCUMENTS

| 4,479,660 | 10/1984 | Pattison | 280/261 |
| 4,895,385 | 1/1990 | Becoat | 280/259 |
| 5,116,070 | 5/1992 | Becoat | 280/259 |
| 5,158,314 | 10/1992 | Pinos | 280/261 |

FOREIGN PATENT DOCUMENTS

| 2556305 | 6/1985 | France . |
| 2574744 | 6/1986 | France | 180/212 |
| 2623157 | 5/1989 | France . |
| WO88/09739 | 12/1988 | PCT Int'l Appl. | 180/224 |

OTHER PUBLICATIONS

"If you've got two legs what's the point of hopping everywhere? John Heath Robinson tests the Sunshine Components two wheel drive Yamaha,", *Performance Bikes*, Feb., 1990, pp.48-53.

"Le Snake Transmission Integrale: Motricite et Felicite", *Velo Vert*, Jan., 1991, pp. 26-30, with translation.

Primary Examiner—Robert J. Oberleitner
Assistant Examiner—Anne Marie Boehler
Attorney, Agent, or Firm—Young & Thompson

[57] ABSTRACT

A drive apparatus for driving the front wheel of a two-wheeled vehicle, such as a bicycle, including front wheel transmission to transmit drive from the drive sprocket to the front wheel including a first chain drive to transmit drive to a first drive element positioned on the frame of the vehicle adjacent a rotatable front wheel support fork, a second chain drive mounted on the support fork to transmit drive from a second drive element to the front wheel hub and drive coupling to transmit drive from the first to the second drive element, wherein the first and second drive elements are spaced from each other along the direction of the support fork and the drive coupling includes a flexible drive shaft coupled to each drive elements by a drive assembly. The drive assemblies permit the ends of the flexible drive shaft to pivot within predetermined limits in substantially vertical planes to accommodate steering movements and be substantially unstressed even at extreme steering positions in use. The drive apparatus can be easily fitted to existing bicycles and bicycle designs, is inexpensive, efficiently transmits drive to the front wheel while permitting steering movements thereof and can accommodate suspension travel of the front wheel.

12 Claims, 2 Drawing Sheets

TWO-WHEELED-DRIVE TWO WHEELED VEHICLE

FIELD OF THE INVENTION

This invention relates to a two-wheel-drive two-wheeled vehicle. Two wheeled vehicles are usually driven by the rear wheel only and this invention is concerned with apparatus for applying drive or motive force also to the front wheel and has particular application to bicycles, though it can also be applied to motorcycles.

BACKGROUND OF THE INVENTION

Known two-wheel-drive two-wheeled vehicles (for simplicity referred to as a "2×2 vehicle") comprise a frame, a rear wheel having a driven hub that is rotatably mounted on the frame, a front wheel support rotatably mounted on the frame for steering the vehicle and connected to handle bars for steering the front wheel, a front wheel having a hub rotatably mounted on a front wheel support, driving means for driving the vehicle, rear wheel transmission means for transmitting drive from the driving means to the driven hub of the rear wheel, and front wheel transmission means for transmitting drive from the driving means to the front wheel including a first drive member to transmit drive to a first drive element positioned on the frame adjacent the front wheel support, a second drive member mounted on the front wheel support and constructed to transmit drive from a second drive element to a front wheel drive element on the front wheel and drive coupling means to transmit drive from the first to the second drive element. Hereinafter a vehicle of this type is referred to as a "2×2 vehicle of the type set forth". 2×2 motorcycles are disclosed in an article entitled "The Gripped On Factor" on pages 48 to 53 of a magazine publication "Performance Bikes", February 1990. The article describes the development of such motorcycles by various persons and says that such bikes are more stable and less skittish than the equivalent rear-wheel drive machines in most situations and particularly in slippery conditions. The article also states that taking drive to the front wheel has many problems, such as routing of chains or shafts to the front of the bike, increased weight, drive efficiency, ensuring loads are not fed into the suspension or steering, and driving the wheels so that the frame is not compressed or stretched.

The main problems are transferring drive to the front wheel, because the front wheel and handle-bar assembly as a whole must turn relatively to the frame for steering, and accommodating suspension travel of the front wheel. To accommodate these problems the developers use a constant velocity joint at the steering axis, and two chain drives in series from the output of the constant velocity joint to the front wheel hub. The chain drives in series are carried on a pair of links. While cumbersome this arrangement was chosen over shaft drives because of concern about unwanted torque reaction and over fluid drives because of inefficiency. This arrangement, while perhaps suitable for motorcycles is believed to be heavy, bulky and expensive for bicycles and cannot easily be adapted to existing bicycles or bicycle frames or designs.

A 2×2 bicycle of the type set forth is described in a French mountain bike magazine entitled "Velo Vert", of approximately January 1991. The bicycle has a specially constructed front wheel support or fork mounted on a modified head tube, with the drive coupling means passing through the fork and/or head tube assembly. Details of the coupling are not known, but it is surmised that it contains a universal joint or gear set. A disadvantage of this arrangement is that it cannot be retrofitted to an existing bicycle or be easily fitted to existing bicycle designs as it appears to be usable only with a bicycle having a specially constructed head tube and front fork that can accommodate the coupling means as well as support input and output shafts for the chain drives. Another disadvantage is that it apparently cannot accommodate suspension travel of a front wheel that is mounted on a front wheel support that includes shock dampers or springs.

The inventor of the present invention has been developing a 2×2 bicycle independently of the developments mentioned previously and has experienced some of the problems mentioned above, particularly the relatively large steering movements of a bicycle compared to those of a motorbike, especially those of so called "mountain bikes" and "moto-cross bikes", and providing a construction that can be fitted to at least some types of existing bicycles and bicycle designs.

Thus, this invention seeks to provide a two-wheel-drive arrangement that is satisfactorily lightweight, inexpensive, efficient, suitable at least for bicycles, and accommodates at least some of the problems and disadvantages of the known designs described above.

SUMMARY OF THE INVENTION

One aspect of the invention provides a drive apparatus for driving the front wheel of a 2×2 vehicle of the type set forth, wherein the first and second drive elements are spaced from each other along the direction of the front wheel support and the drive coupling means includes a flexible drive shaft.

Preferably the flexible drive shaft is connected to a drive element of the endless drive type in such a manner that the end of the flexible drive shaft can pivot to accommodate steering movements of the front wheel to be substantially unstressed even at extreme steering positions in use.

The flexible drive shafts permits torque to be transmitted to the front wheel, while allowing rotation of the front wheel support relative to the frame for steering the vehicle. The flexible drive shaft is satisfactorily inexpensive, efficient and reliable in use. Also the flexible drive shaft can be fitted to most existing bicycles and bicycle designs. The flexible drive shaft is relatively short, so that any torque wind-up is minimal while steering movements are adequately accommodated.

The front wheel transmission means is constructed to drive the front wheel at a speed and torque that is substantially equal to the speed and torque at which the rear wheel is driven.

For a bicycle the driving means comprises an assembly of a driving sprocket and pair of pedals. For a motorcycle the driving means comprises a motor.

In one form of the invention the first drive member is constructed to transmit drive indirectly from the driving means via the driven hub of the rear wheel to the hub of the front wheel. With this construction the front and rear wheels are driven at speeds related to each other regardless of any gear change mechanism for the rear wheel that is located at the rear wheel hub or driving means. In other words, the drive from the driving means to the first drive element is taken from the rear hub after or "downstream of" the gear change mechanism. Thus, any such gear change mechanism is also effective for the front wheel drive. This is suited mainly to bicycles which have epicyclic or derailleur change mechanisms at the rear wheel hub and/or at the driving means.

In another form of the invention, the front wheel transmission means is constructed to transmit drive directly from the driving means to the first drive element. This is primarily intended for use with single speed bicycles, such as moto-cross type bicycles (so called BMX's), and motorcycles where there is a gear change mechanism at the drive means or motor.

Each drive member is preferably of the endless drive type comprising two spaced, rotatable drive elements and an endless member passing around and engaged with both drive elements. While the endless member may be a plain or toothed belt, preferably it is an endless chain and the drive elements are sprocket wheels. A link and roller chain is preferred. A shaft drive may be used for one or both of the drive members if desired.

The flexible drive shaft may be connected directly to the drive elements of the endless drive type drive member, the flexible drive shaft being routed to ensure the front and rear wheels rotate in the same direction. While simple and inexpensive, this construction is not preferred because the flexible drive shaft may obstruct a rider and will be untidy and subject to snagging on obstacles.

Preferably the flexible drive shaft is connected to a drive element of the endless drive type through first and second engaged gears rotatably included in a drive assembly, the first gear being connected to the drive element and the second gear being connected to the flexible drive shaft. The second gear is preferably carried by a cage means that rotatably supports the second gear in engagement with the first gear such that the second gear can rotate at least within predetermined limits about the rotational axis of the first gear. This construction permits relatively free movement of the flexible drive shaft whereby even a relatively short flexible drive shaft can be used and in use will present minimal interference with steering movements of the front wheel and be subject to minimal stresses and internal friction even at extreme steering angles.

Suitable means, such as stops or springs, are preferably provided to limit the rotational movement of the cage means.

The first and second gears may be any suitable gears. Helical gears are preferred. Bevel gears or suitable bidirectional worm wheel and roller gears are preferred.

Mounting means is provided for mounting the drive assembly on a two-wheeled-vehicle. The mounting means is preferably constructed to be movable for tensioning an endless drive to which it is connected.

Tensioning means, such as at least one jockey pulley or sprocket, may be provided for guiding and tensioning the endless belt.

Another benefit of the flexible drive is that, apart from its ability to accommodate steering movements of the front wheel, it can also accommodate movement of a front wheel support that includes telescopic elements, such as shock dampers and springs.

The drive apparatus described above may be constructed as part of a kit for fitting to existing two wheeled vehicles. Preferably the kit also includes at least one of rear and front drive hubs that carry drive elements, such as sprockets. Preferably the drive hubs are of the free-wheel type so that the wheels rotate freely in a direction of forward movement even when the drive apparatus is stationary.

Another aspect of the invention comprises a two-wheeled-vehicle fitted with the drive apparatus described above.

Further features, variants, and/or advantages, of the invention will become apparent from the following non-limiting description made with reference to the accompanying schematic drawings of a presently preferred embodiment of the invention.

DESCRIPTION OF PREFERRED EMBODIMENTS

Figure 1:
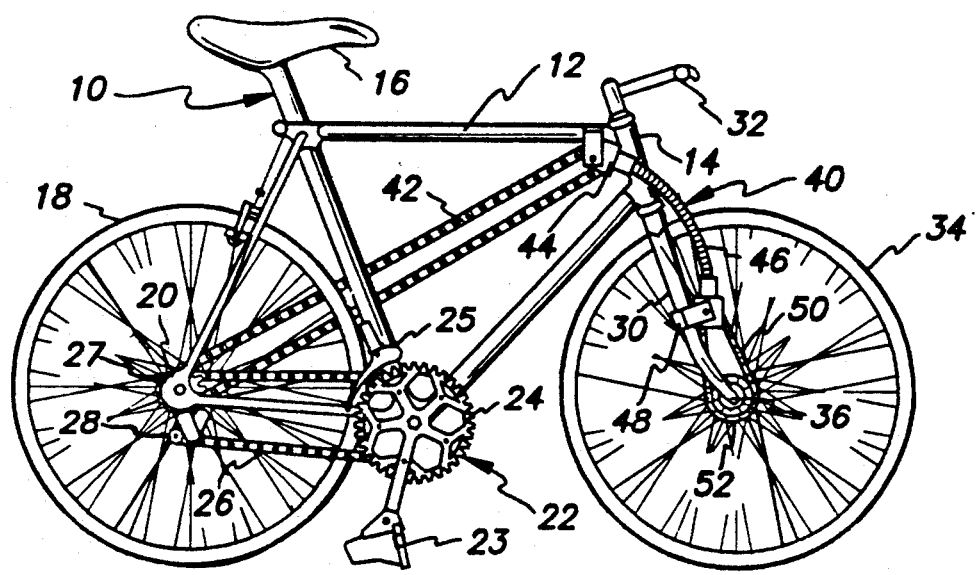
FIG. 1 shows a side view of an example of two-wheel-drive (2×2) bicycle of the invention including a flexible drive.

In the drawings the same or similar parts are indicated by the same reference numerals.

Figure 2:
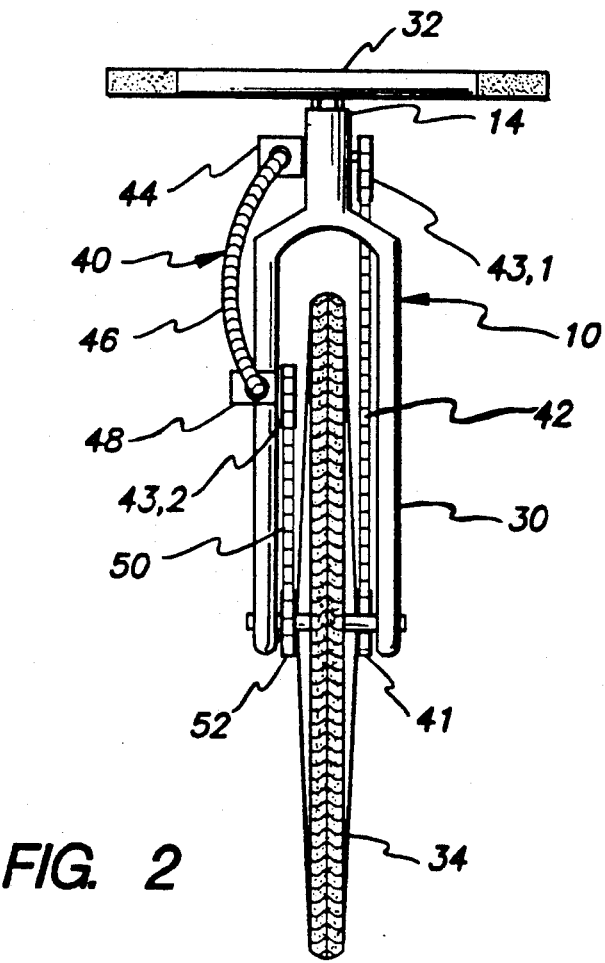
FIG. 2 shows a front view of the bicycle of FIG. 1, certain parts being omitted for clarity of illustration.

FIGS. 1 and 2 show a two-wheel-drive or 2×2 bicycle 10 comprising a frame 12 having a head tube 14, a saddle 16 adjustable mounted on the frame, a rear wheel 18 having a free-wheel hub 20 mounted on the rear of the frame, a drive means 22, a front wheel support or fork 30 rotatably supported by the head tube 14, handlebars 32 secured to the front support fork for steering the bicycle, a front wheel 34 having a drivable free-wheel hub 36, and a drive apparatus 40 for driving the front wheel. Other than the drive apparatus 40 and the hub 36, the bicycle is a substantially conventional bicycle and the exact shape and construction of the components thereof may take any suitable or desired form.

The drive means 22 is also substantially conventional and comprises a front sprocket set 24 composed of two drive sprocket wheels of differing diameters and numbers of sprockets rotatably supported on the frame, pedals 23 secured to the sprocket set 24 for driving the bicycle, a front derailleur mechanism 25, a drive chain 26, a rear wheel driven sprocket set 27 comprising a plurality sprocket wheels of differing diameters and number of sprockets, and a rear derailleur mechanism 28. The derailleur mechanisms 25 and 28 are operable by a rider to change the sprocket wheels of the drive and driven sprocket sets to obtain a desired gear ratio for the rider to drive the bicycle.

The drive apparatus 40 comprises a drive sprocket wheel 41 on a free-wheel hub mounted on the rear-wheel hub and secured to rotate with the sprocket set 27, a first drive chain 42 engaged with the sprocket wheel 41 and with a sprocket wheel 43.1 of a first drive assembly 44 mounted on the frame adjacent the head tube 14, a flexible drive shaft 46 connected to the assembly 44, a second drive assembly 48 mounted on the front support fork 30 and also connected to the flexible drive shaft, and a second drive chain 50 engaged with a sprocket wheel 43.2 of the second drive assembly 48 and with a front wheel driven sprocket 52. Each of the drive chains 26, 42, and 50 are of the link and roller type.

The rear sprocket wheel 41 rotates at the same speed as the sprocket set 27, so that changing the gear ratio of the drive means 22 is also effective for the drive apparatus 40. The sprocket 41 is mounted on the hub on the side thereof that is opposite the sprocket set 27 to keep the chain 42 as close to the frame as possible and to facilitate converting an existing rear wheel drive only bicycle to a two-wheel-drive bicycle. The front drive sprocket is mounted on the front-wheel free-wheel hub inboard of the fork of the front wheel support. The free-wheel hubs 20, 36 and 41 permit each wheel to be driven forwardly, while allowing the wheels to free-wheel when the pedals are not being turned.

Figure 3:
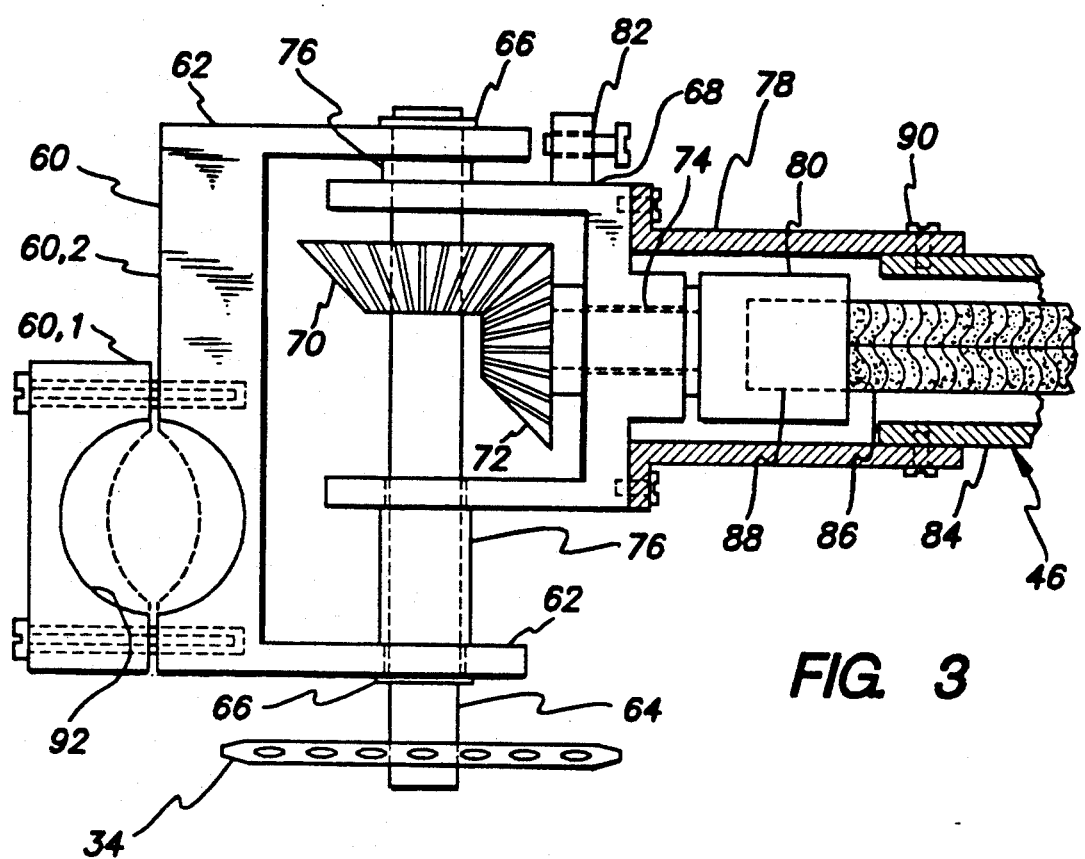
FIG. 3 shows a view of an assembly of a bevel gear set, a sprocket and an end region of the flexible drive of the bicycle of FIG. 1.
Figure 4:
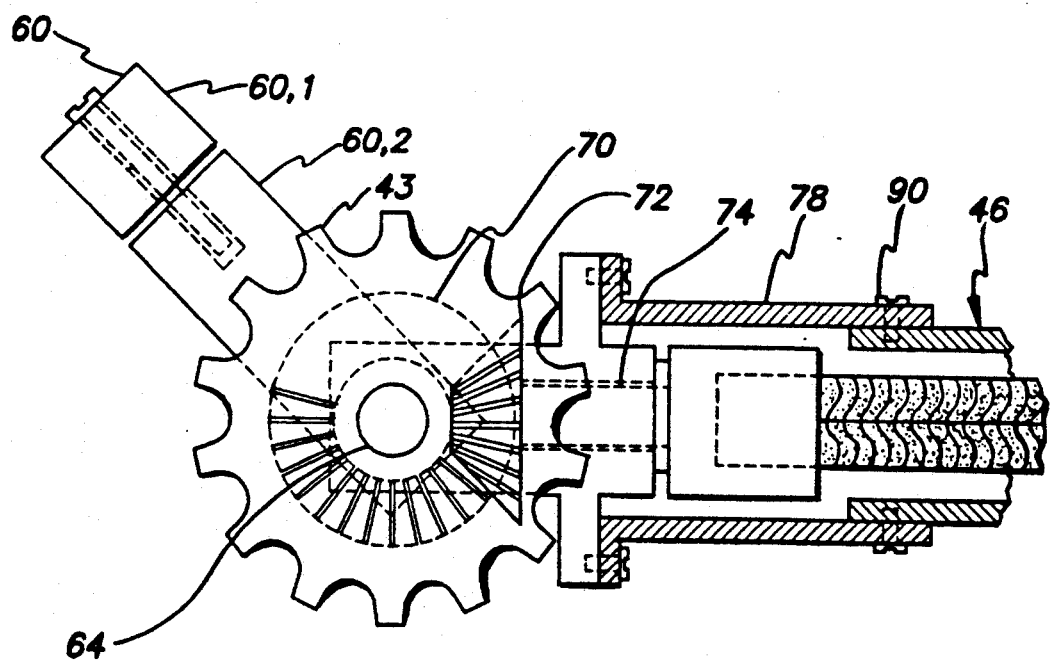
FIG. 4 shows a view of the assembly of FIG. 3 at right angles to the view of FIG. 3.

The drive assemblies 44 and 48 are similar and are shown in FIGS. 3 and 4. Each assembly comprises a clamp body 60 composed of two parts 60.1 and 60.2 that is clamped onto the frame and fork as shown in FIGS. 1 and 2, journal arms 62 extending from the clamp body, a shaft 64 rotatable in the arms 62 and secured in position by circlips 66, a cage member 68 rotatably mounted on the shaft 64, a sprocket wheel 43 and a first bevel gear 70 solidly connected to the shaft 64, and a second bevel gear 72 mounted on a shaft 74 rotatably supported on the cage member. Spacers 76 are provided on the shaft 64 to position the cage member 68 such that the bevel gears 70 and 72 engage each other. A support tube 78 is secured to the cage member to extend around an end portion of the flexible drive shaft 46. An adjustable stop member 82 is provided on the cage member 68 to limit movement of the cage member so that the flexible drive shaft cannot be deformed into an S-shape when it is compressed by steering movements; for clarity this is shown in FIG. 3 only.

The flexible drive shaft 46 comprises an outer casing 84, an inner drive member or core 86, such as a cable of alternating direction spirally wound steel wires, and a drive cap 88 of square cross-section secured to each end of the core. The outer casing 84 is fixed to the support tube 78 by grub screws 90 and the drive cap 88 engages in a square bore in an end portion 80 of the shaft 74.

In tests on prototypes it has been found that a flexible drive shaft with a core of 10 to 15 mm diameter is satisfactory to accommodate the required torques generated by an experienced rider on a 21-speed bicycle. The casing is plastic coated wound steel casing. The casing may also be of plastics or have a plastics inner liner which minimises friction between the core and the casing. Thinner or heavier flexible drive shafts may be used depending on intended application, such as for children, for competition use or for motorbikes.

The drive assembly 44 is mounted on the frame such that the cage member and gears are mostly contained within the frame and behind the head tube so as to present a minimal obstacle to a rider.

The drive assembly 48 is mounted on one arm of the fork 32 using a sleeve 92 shown in dotted lines in FIG. 3. The sleeve has a bore corresponding to the outer profile of the arm of the fork. The sprocket 43.2 of the drive assembly is connected by the chain 50 to the driven sprocket 52 on the front wheel hub.

The drive assemblies 44 and 48 can be adjusted along the lengths of the respective frame member and arm of the fork to ensure the chains 42 and 50 are properly tensioned.

The assemblies 44 and 48 are each mounted such that the ends of the flexible drive shaft can move or pivot in substantially vertical planes. The pivoting of the cages of the assemblies 44 and 48 and ends of the flexible drive shaft allows the use of a relatively short flexible drive shaft 46; flexible drive shafts of from 250 to 400 mm have been used successfully, though a shaft of between 250 and 300 mm has been found to be most appropriate. For example, even though short, it has been found that the flexible drive shaft is not caused, in use, to bend in such a manner that significant internal friction is generated when the front wheel is turned and also that the flexible drive shaft does not significantly affect steering. In this regard it must be appreciated that the flexible drive shaft is either stretched or compressed as the front wheel is steered and without the pivoting of the cages this would bend the flexible drive shaft excessively and affect steering adversely. The short drive shaft exhibits minimal torque wind-up and backlash.

As is known in the art, a flexible drive shaft should preferably operate at as high a rotational speed as is possible. Thus larger sprocket wheels are used at both wheel hubs than at the sprocket wheels of the drive assemblies and the bevel gears are selected such that the bevel gears 70 has more teeth than the bevel gears 72. In a prototype the sprocket wheels 41 and 52 have 16 teeth and the sprocket wheels 43 have 10 teeth, while the bevel gears 70 and 72 have a gear ratio of between 1:1.25 and 1:2; this provides a rotational speed of between about 80 and 800 r.p.m. in most applications.

The flexible drive shaft and drive assembly construction is relatively inexpensive, is neat in appearance, presents minimal obstruction to a rider and is satisfactorily efficient in transferring drive. Further benefits are that it can be fitted to most existing bicycles and bicycle designs and can accommodate telescopic elements, such as shock dampers and springs in the are of the front fork or between the front fork and head tube. The drive apparatus still permits the front and rear wheels to be relatively easily removed for changing or repairing a wheel or for transport; in this event the clamp of the appropriate drive assembly 44 or 48 is released to allow the respective chain 42 and 50 to be relaxed to be disengaged from the respective sprocket wheel and the hub.

It is to be understood the invention is not limited to the precise constructional details shown in the drawings and described above and modifications may be made thereto and other embodiments become apparent without departing from the spirit of the invention. For example, the drive for the front wheel may be taken from a drive sprocket at the pedals for a single speed bicycle. Chain guards may be provided for protecting the chains 42 and 50. One or more jockey pulleys may be provided for tensioning and guiding the chain 42. Two flexible drive shafts may be provided, one on either side of the front fork to transmit more torque and power if required. In this event the drive assembly would be modified to drive the two drive shafts and a drive assembly 48, chain 50 and drive sprocket wheel 52 would be provided on each side of the front wheel. Also, instead of having the sprocket wheel 41 and chain 42 arranged on the side of the frame opposite that of the drive means 22 it is possible to have them on the same side. In this event one of the sprocket wheels or an additional sprocket wheel on the sprocket set 27 may be used for driving the chain 42. It is also possible to use a worm gear or other gear types in the drive assemblies as is appropriate. For instance in order to obtain a high rotational speed for the flexible shaft it is possible to use bidirectional helical worm wheel and roller gears to obtain high gear ratios, such as up to 20:1.

I claim:

1. A drive apparatus for driving the front wheel of a two-wheeled-drive two-wheeled vehicle including a frame, a rear wheel having a driven hub that is rotatably mounted on the frame, a front wheel support rotatably mounted on an upper mounting of the frame and having a portion extending downwardly from the frame, handle bars connected to an upper region of the front wheel support for steering the vehicle, a front wheel having a front wheel hub rotatably mounted on a lower region of the front wheel support, driving means for driving the vehicle, rear wheel transmission means for transmitting drive from the driving means to the driven hub of the rear wheel, and front wheel transmission means for transmitting drive from the driving means to the front wheel, wherein the front wheel transmission means comprises a first drive gear assembly mountably on the frame adjacent the front wheel support, a first drive member to transmit drive to the first drive gear assembly, a second drive gear assembly mountable on the front wheel support at a position spaced from the upper mounting of the frame and constructed to transmit drive to a front wheel drive element engaged with the front wheel and a flexible drive cable rotatable within a flexible outer casing connected to the first and second drive gear assemblies for transmitting drive from the first to the second drive gear assemblies, the first drive gear assembly being constructed to allow substantial pivotal movement of the rotatable drive cable with respect to the frame such that the flexible drive cable can pivot to accommodate steering movements of the front wheel to be substantially unstressed within the outer casing even at extreme steering positions in use.

2. The drive apparatus of claim 1, wherein the vehicle is a bicycle and the driving means comprises an assembly of at least one driving sprocket and pair of pedals.

3. The drive apparatus of claim 1, wherein the first drive member is an endless drive comprising two spaced, rotatable endless drive elements and an endless member passing around both of the endless drive elements.

4. The drive apparatus of claim 3, wherein the drive member is a chain drive with the endless drive elements being sprocket wheels and the endless member being a link and roller chain.

5. The drive apparatus of claim 1, wherein each drive gear assembly includes mounting means for mounting the drive assembly on the frame of a two wheeled vehicle.

6. The drive apparatus of claim 1, wherein the front wheel transmission means is constructed to drive the front wheel at a speed and torque that is substantially equal to the speed and torque at which the rear wheel is driven.

7. The drive apparatus of claim 1, wherein the first drive member drivingly connects the driven hub of the rear wheel to the first drive gear assembly.

8. The drive apparatus of claim 1, for use on a vehicle having a gear ratio change mechanism for driving the rear wheel, wherein the first drive member is constructed to transmit drive from the driven hub of the rear wheel downstream of the gear ratio change mechanism to the first drive gear assembly, so that any change of gearing for driving the rear wheel is also effective for driving the front wheel.

9. The drive apparatus of claim 1, including rear and front driven hubs that allow the rear and front wheels to rotate freely in a direction of forward movement even when the drive apparatus is stationary.

10. The drive apparatus of claim 1, wherein the first drive gear assembly comprises first and second engaged gears, a first cage means rotatably supporting the first gear and mountable on the frame to mount the first gear in a fixed relationship to the frame, and a second cage means rotatably mounted on the first cage means and supporting the second gear in engagement with the first gear such that the second gear can rotate within predetermined limits about the rotational axis of the first gear and relatively to the frame, the first gear being connectable to the first drive member and the second gear being connected to the flexible drive cable.

11. The drive apparatus of claim 10, wherein the first drive member comprises an endless drive and the first cage means includes mounting means constructed to allow movement of the first drive gear assembly on the frame so that the endless drive can be tensioned.

12. A two-wheeled-drive two-wheeled vehicle including a frame, a rear wheel having a driven hub that is rotatably mounted on the frame, a front wheel support rotatably mounted on an upper mounting of the frame and having a portion extending downwardly from the frame, handle bars connected to an upper region of the front wheel support for steering the vehicle, a front wheel having a front wheel hub rotatably mounted on a lower region of the front wheel support, driving means for driving the vehicle, rear wheel transmission means for transmitting drive from the driving means to the driven hub of the rear wheel, and front wheel transmission means for transmitting drive from the driving means to the front wheel comprising a first drive gear assembly mounted on the frame adjacent the front wheel support, a first drive member to transmit drive to the first drive gear assembly, a second drive gear assembly mountable on the front wheel support at a position spaced from the upper mounting of the frame and constructed to transmit drive to a front wheel drive element engaged with the front wheel and a flexible drive cable rotatable within a flexible outer casing connected to the first and second drive gear assemblies for transmitting drive from the first to the second drive gear assemblies, said first drive gear assembly being constructed to allow substantial pivotal movement of the rotatable drive cable with respect to the frame such that the flexible drive cable can pivot to accommodate steering movements of the front wheel to be substantially unstressed within the outer casing even at extreme steering positions in use.

* * * * *